(12) United States Patent
Davis

(10) Patent No.: US 6,279,877 B1
(45) Date of Patent: Aug. 28, 2001

(54) ELECTRIC WIRE FISHING IMPLEMENT

(76) Inventor: William Davis, 1452 Wildwood Lakes Blvd., #A-103, Naples, FL (US) 34104

(*) Notice: Subject to any disclaimer, the term of this patent is extended or adjusted under 35 U.S.C. 154(b) by 0 days.

(21) Appl. No.: 09/496,417

(22) Filed: Feb. 2, 2000

(51) Int. Cl.$^7$ ..................................................... B63B 35/03
(52) U.S. Cl. ......................... 254/134.3 FT; 254/134.3 R; 403/296
(58) Field of Search .................... 254/134.3 FT, 254/134.3 R; 403/296, 343; 15/104.33, 104.32

(56) References Cited

U.S. PATENT DOCUMENTS

| | | | | |
|---|---|---|---|---|
| 4,299,067 | * | 11/1981 | Bertschi | 52/127 |
| 4,406,561 | * | 9/1983 | Ewing | 403/343 |
| 4,573,829 | * | 3/1986 | Keene et al. | 405/157 |
| 5,052,660 | * | 10/1991 | Bergman | 254/134.3 FT |
| 5,687,954 | * | 11/1997 | Schroeder | 254/134.3 FT |
| 5,938,180 | * | 8/1999 | Walsten | 254/134.3 FT |
| 6,073,642 | * | 6/2000 | Huang | 135/114 |

FOREIGN PATENT DOCUMENTS

230273 * 6/1959 (AU) ............................ 254/134.3 FT

* cited by examiner

Primary Examiner—Derris H. Banks
Assistant Examiner—Daniel Shanley
(74) Attorney, Agent, or Firm—Werner H. Schroeder

(57) ABSTRACT

The invention pertains to an electric wire fish implement including fiberglass sections which are connected to each other to form an elongated implement which is used to introduce wires into inaccessible locations. The fiberglass sections are connected to each other by way of connectors at each end of the sections. The connectors are made of brass so that they can easily be attached to the fiberglass section ends by impressed dimples. one of the connectors is a female connector having a cylindrical recess therein. The other connector is made up in the same way but a threaded male stud is inserted therein and securely and permanently fastened therein. The male stud has a shore hardness considerably greater than the sleeve material. This stud helps to avoid breakage of the connection between the fiberglass sections when subjected to extreme or undesirable bends. There is also disclosed a way of quickly connecting or disconnecting various sections to or from each other, respectively. The quick connect connector can either be dovetail connections or could be form-fit connections where the connector material is made of plastic and will yield to obstructive elements. It is also disclosed that reinforcing coils could be surrounding the fiberglass sections adjacent to their connections to any one connection.

8 Claims, 4 Drawing Sheets

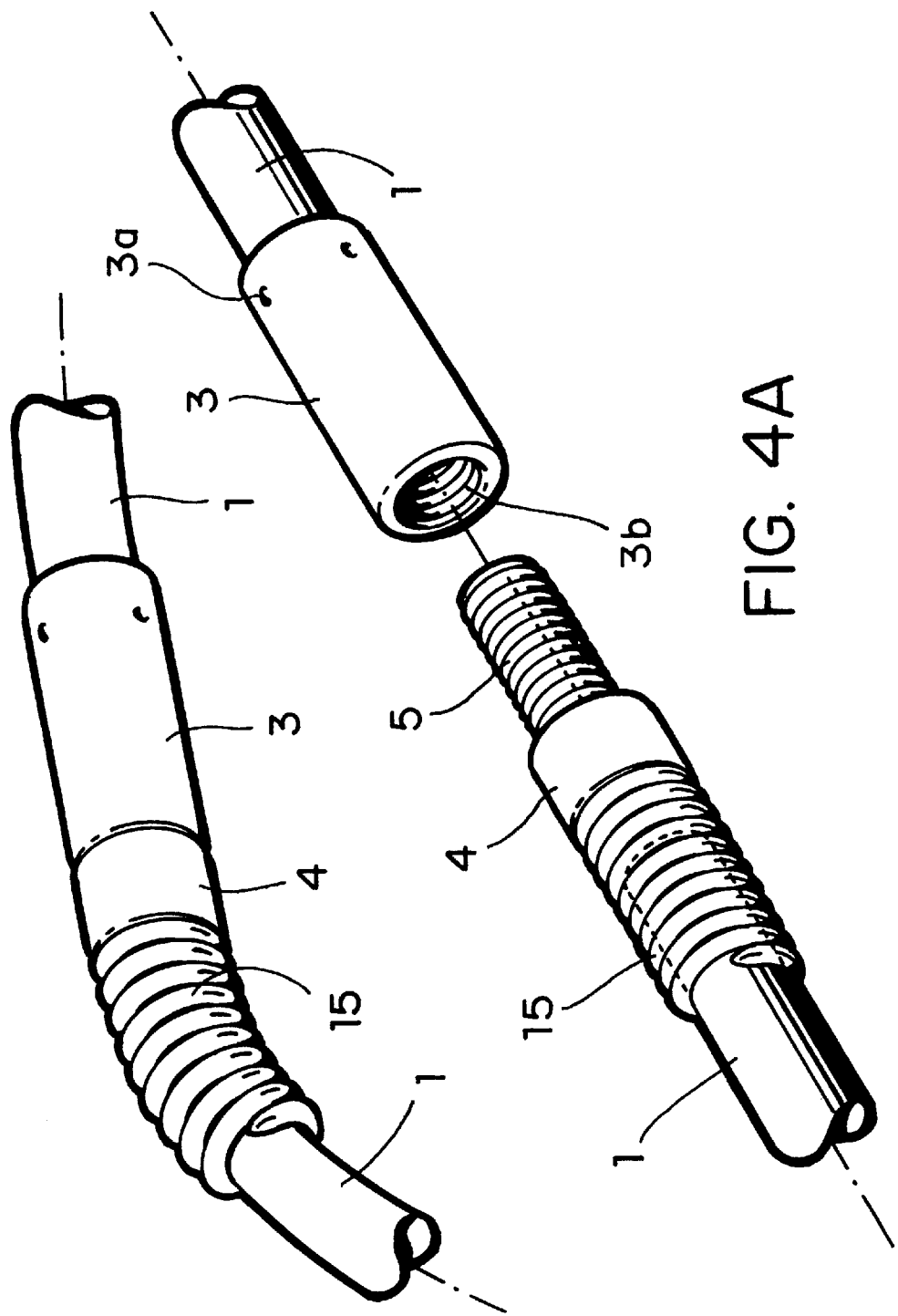

ELECTRIC WIRE FISHING IMPLEMENT

CROSS-REFERENCES TO RELATED APPLICATIONS (not applicable)

STATEMENT REGARDING FEDERALLY SPONSORED RESEARCH OR DEVELOPMENT (not applicable)

REFERENCE TO A MICROFICHE APPENDIX (not applicable)

BACKGROUND OF THE INVENTION

This invention pertains to an implement for threading electric wires through inaccessible spaces or areas. Fishing tapes are well known that are used for threading or pulling electric wires through pre-existing conduits. A condition is that the conduits are pre-existing in walls or floors when they are being constructed. The fishing tapes are made of steel and are quite flexible and easily follow the interior hollow of the conduits which can have quite a few bends or curves. They also can follow a considerable distance.

A problem arises when there are no pre-existing conduits to pull a wire through the same and yet electrical wires have to be placed in walls or ceilings as is often found in retrofits of buildings or houses or when remodeling the same. Sometimes extra electric outlets are desired or demanded in certain areas or extra switches are necessary. The only areas where extra wires could be placed is found in false ceilings or hollow stud walls. The use of the fishing implement of this invention is not limited to only electrical wires but could involve telephone wires, TV cables, alarm system cables or wires used to operate remote thermostats The known flexible fishing tapes are useless because they are too flexible and would coil up after a short distance. The fishing implement of this invention therefore, should be rather rigid but still flexible enough to overcome some obstructions found in walls or false ceilings. in order to be transportable, the implement should consist of shorter sections that can be connected to each other to form a longer piece. The length of each section could be four to six feet long or longer in some circumstances. An advantage of the inventive implement is that it is preferably made of fiberglass. This would eliminate all possibilities of electric shocks when working in an electrical environment which could pose quite a hazard for a worker.

Experiments have shown that a more rigid fishing device has certain drawbacks that are being addressed in this specification. As mentioned above, the device at hand involves several sections of a certain length that are connected together to form a long implement. The known connections are female connectors that are applied at either end of a section of a fish rod and the final connections are accomplished by male connection pieces which are screwed into both ends of the female connectors. It has been found that, while this method works quite well, it has its disadvantages in that more male loose male connectors must be kept on hand because they can easily get lost due to their small individual sizes. Furthermore, if the individual connector elements are made of steel, it is difficult to attach the female parts to the fiberglass rods because it is difficult to place fastening dimples into the steel sleeves to connect to the fiberglass rods. Consequently, the sleeves must be fastened to the fiberglass rods by gluing. It is also known to make the above noted connector elements from brass. This presents no problem to fasten the various sleeves to the fiberglass rods by the method of driving dimples into sleeves which also will penetrate into the fiberglass material to assure a secure fastening. It has been found, however, that once the various elements are manufactured from brass, the connection made is somewhat weak in that if any intentional or inadvertent bending of an elongated fish element occurs, the brass components can break.

DESCRIPTION OF THE RELATED ART

U.S. Pat. No. 5,052,660 illustrates an example of a fish stick made up of several sections, wherein the several actions are fastened to each other by various connectors.

U.S. Pat. No. 3,102,715 shows a typical flexible fish tape that has to pass through a conduit to reach its destination U.S. Pat. No. 2,750,15 illustrates a flexible fish tape having an insulating sleeve thereon.

U.S. Pat. No. 1,730,993 discloses an electric wire fish line which may be of any suitable material, such as steel and of a construction having suitable rigidity and elasticity. It further illustrates a preferred form of a head attached to the line.

BRIEF DESCRIPTION OF THE DRAWINGS

FIGS. 4 and 4A show the inventive fish implement in a straight line and having a bend therein with reinforcing elements.

DETAILED DESCRIPTION OF THE INVENTION

Figure 1:
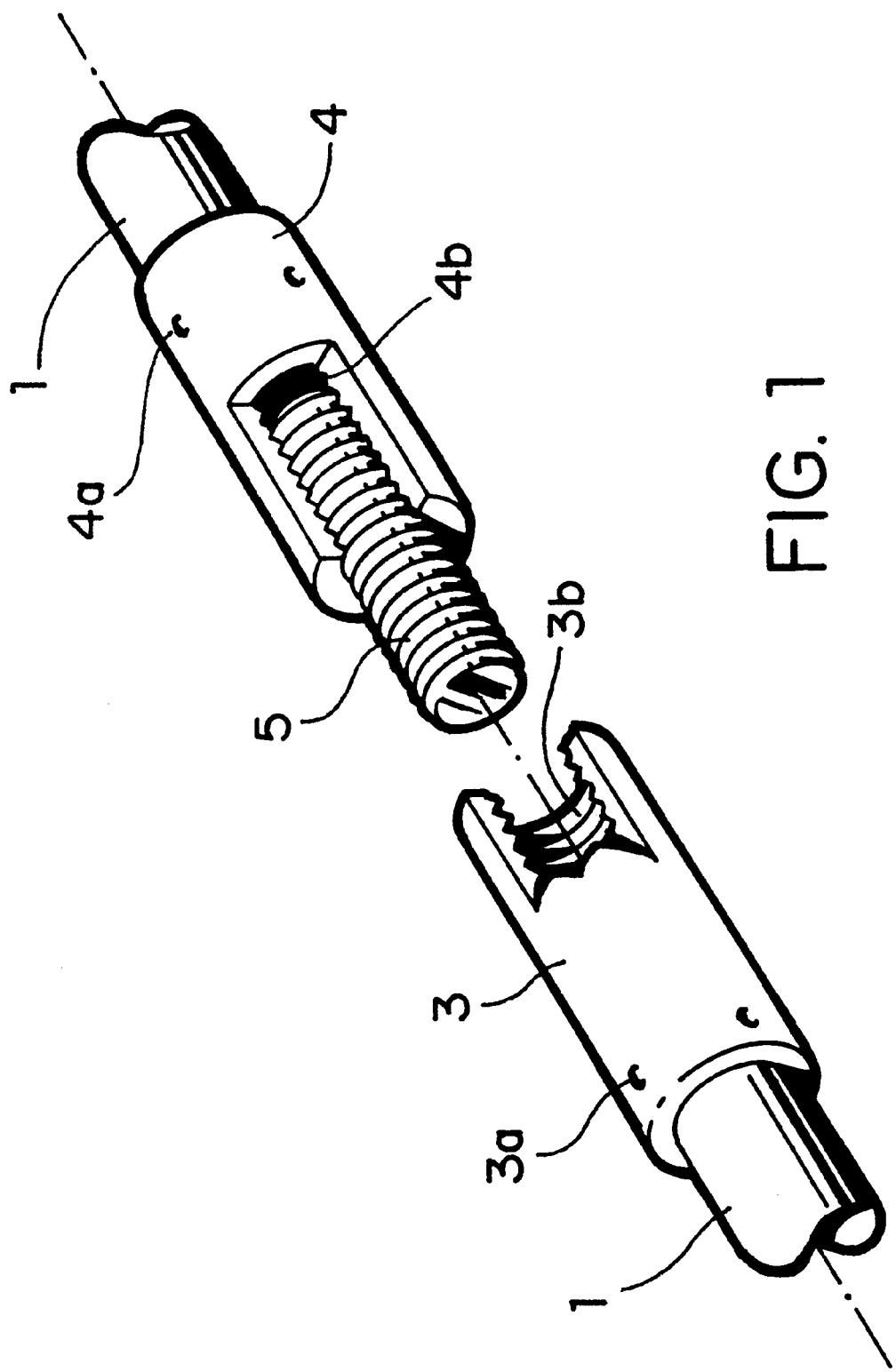
FIG. 1 illustrates the inventive fish implement with parts broken away for clarity

In FIG. 1, there can be seen the fiberglass rods 1. Each of the fiberglass rods 1 has connector elements 3 and 4 fastened to the rod by dimples 3a and 4a, respectively. The connector elements or sleeves 3 and 4 are made of brass. This enables the connectors or sleeves to easily be fastened to the fiberglass rods by impressing dimples into the brass material because this metal is quite malleable or more so when compared to steel. Each of the connector sleeves 3 and 4 have interior threads 3b and 4b, respectively, formed therein. The male threaded insert or stud 5 is made of steel and then is permanently anchored within the sleeve 4. The permanent anchoring can be obtained by gluing or any other means. The permanent anchoring is preferred so that the male threaded element or stud 5 cannot be lost or displaced. The male stud or element 5 also serves the purpose of reinforcing the connection of elements or sleeves 3 and 4 against breakage in case the fish implement is bent beyond a desirable or tolerable curve, this is so, because the male stud 5 is made of a material which has a higher shore hardness than the sleeve 4 which preferably is made of brass. The individual sections that make up the total length of the implement, therefore, have an end having a female connector and another end having a male connector. It is also preferred that the threads of the male and the female connector have ¼" threads. This will standardize the threading of the implement because many devices found in hardware stores, such as, hooks, eyelets, rings and other gadgets useful in combination with fishing electric or other wires through inaccessible locations, are all known to have ¼" threads.

Figure 2:
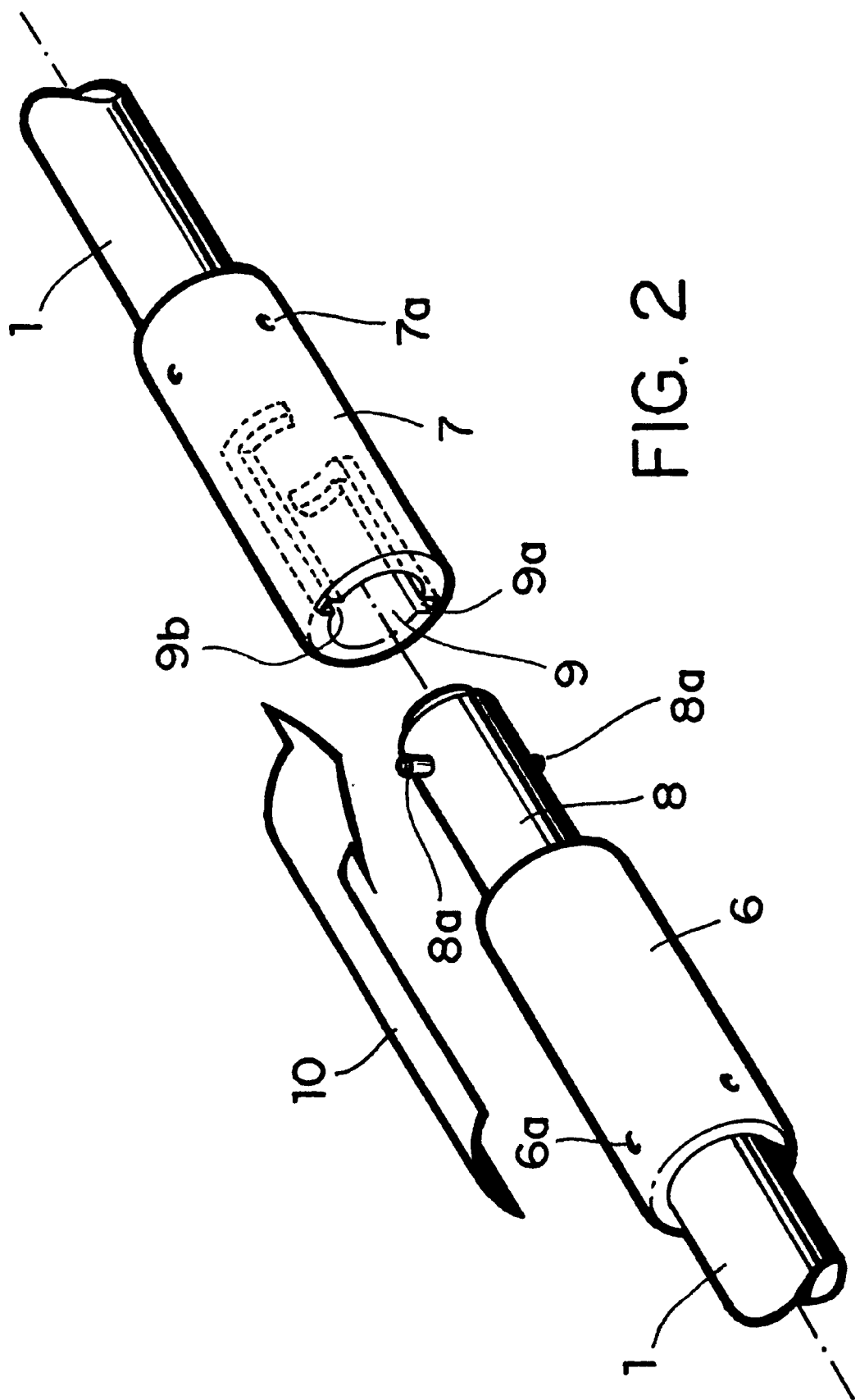
FIG. 2 shows a different way of attaching connector elements to each other.

Turning now to FIG. 2, there is shown a different system of connecting various sections of the fish implement together. Again, there is a sleeve 6 being fastened to the fiberglass rod 6 by way of dimples 6a impressed into the sleeve and into the fiberglass material which will assure a secure attachment to the fiberglass rod. From the sleeve 6, a male connector stud 8 protrudes with two oppositely placed pins 8a secured thereon. The connector 7 on the other to be connected rod 1 has an interior bore 9 therein. the bore 9 further has two oppositely placed grooves 9a and 9b placed therein which end in right angles to the grooves. To make a connection with this system, it is merely necessary to guide the stud 8 into the interior bore 9 while matching the pins 8a with the grooves 9a and 9b and then make a turn as is indicated by arrow 10. This connector system assures a quick but secure connection.

Figure 3:
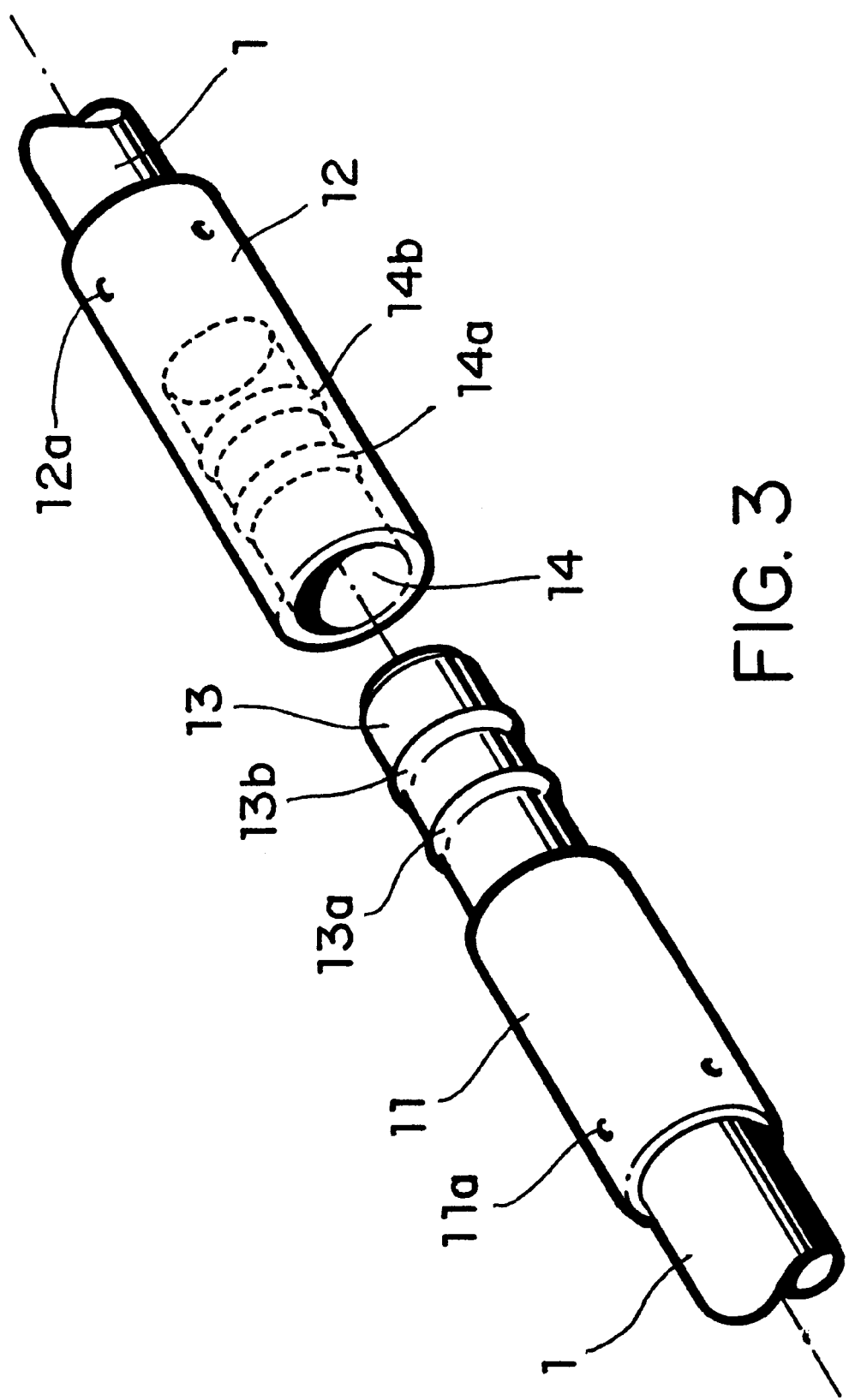
FIG. 3 shows another way of attaching connector elements to each other.

FIG. 3 shows yet another system of connecting sections of the fish implement together. This system may be considered as a snap-fit or quick connection. To this end, there is shown a sleeve 11 having pressure dimples 11a therein for connecting the same to a fiberglass rod 1. In this connector, the sleeve 11 is made of a plastic material such as nylon or polyethylene which renders this type of material flexible to a certain extent. The stud 13, being part of the sleeve 11, has either one ring 13a or a second 13b ring thereon being integral with the stud 13. The other connector part is a sleeve 12, again fastened to the fiberglass rod 1 by way of dimples 12a, has an interior cylinder 14 arranged inside the sleeve 12 and has one recessed ring 14a or another recessed ring 14b molded therein. It is well known that plastic materials have a certain give or yield when pressure is exerted upon the same. This knowledge is used to an advantage when applied to the inventive connection with regard to FIG. 3. When the male stud 13 of sleeve 11 is pushed into the interior cylinder of connector sleeve 12, the one 13a or the other 13b or both of the rings on the stud 13 will encounter the interior wall of cylinder 14 to thereby expand the same until the one 13a or the other 13b or both rings snap into one of the interior grooves 14a or 14b or both of them for a snap fit or a form fit. This type of a connection is considered a snap fit which may come in handy in many situations where a quick connect or disconnect is desired.

Finally, in FIGS. 4 and 4A there is shown a reinforcement for the fiberglass rods immediately adjacent to their connector sleeves as a protective measure. To this end, a coil 15 of at least 10 turns is placed next to each end of the sleeves 3 and 4 so that any sudden sharp bend occurring in the fiberglass rod because of some obstruction encountered down the length of the fish implement is not transferred adjacent to the sleeve 4 or sleeves 3 and 4.

SUMMARY OF THE INVENTION

It can now be seen that many improvements have been made in the disclosed electric wire fish implement. Thus, for example, the internal stud element is made of a different metal to avoid easy breakage of the connector elements. Different quick connect and disconnect connector elements have been disclosed. Reinforcements adjacent the ends of connector sleeves have been introduced. Although it seems to be quite a simple matter, experiments have shown that when the threading elements use a standard ¼" thread system, many other helpful components can be used in connection with an electric wire fish operation.

What I claim is:

1. An electric wire fish implement for introducing wires into inaccessible areas of a structure, comprising:

A first fiberglass section having at one end thereof a hollow female connector having interior threads therein;

said fiberglass section having at its other end a second female connector having interior threads therein;

both of said first and said second female connectors are constructed of a metal of a hardness so that dimples can be pressed into said connectors to securely fasten said connectors to said fiberglass sections;

a threaded male stud is permanently secured in one of said female connectors, said threaded male stud has a shore hardness which is considerable higher when compared to the shore hardness of said first and second female connectors.

2. The wire fish implement of claim 1, wherein said interior threads and said threads on said male stud are one quarter inch threads.

3. The wire fish implement of claim 1 including reinforcing coils placed adjacent to each of the said connectors and around said fiberglass section.

4. An electric wire fish implement for introducing a wire into inaccessible locations, comprising:

a first female connector securely fastened to one end of a fiberglass section, said female connector having a cylindrical interior, a second female connector securely fastened to another end of said fiberglass section, said second female connector having a male stud protruding therefrom in the direction of said fiberglass section, means on both said first and said second connectors for a quick connect or disconnect of said connectors when compared to screw connections.

5. The wire fish implement of claim 4, wherein said interior of said first female connector has two oppositely placed longitudinal first grooves therein that end in second grooves placed normal to said first grooves, said stud protruding from said second connector has a diameter matching the cylindrical interior of said first connector and further having two oppositely placed pins mounted thereon, said stud when placed into said cylindrical interior of said first connector, will track said first grooves with said oppositely placed pins and a turn of said second connector will move said pins into said second grooves.

6. The wire fish implement of claim 4, wherein said first and said second connectors are made of a plastic and yieldable material.

7. The wire fish implement of claim 6, wherein said first connector having said cylindrical interior further has at least two recessed rings therein, said second connector having said male stud protruding therefrom and having a diameter which matches said cylindrical interior of said first connector, said male stud further having two exterior rings placed thereon; said rings on said male stud snapping into said recessed rings of said first connector when said second connector is pushed into said first connector.

8. The wire fish implement of claim 7 including reinforcing coils placed around said fiberglass section adjacent to said first and said second connectors.

* * * * *